US005667607A

United States Patent [19]

Sugiura et al.

[11] Patent Number: 5,667,607

[45] Date of Patent: Sep. 16, 1997

[54] PROCESS FOR FABRICATING ELECTROLUMINESCENT DEVICE

[75] Inventors: Kazuhiko Sugiura, Nagoya; Masayuki Katayama, Handa; Nobuei Ito, Chiryu; Tadashi Hattori, Okazaki, all of Japan

[73] Assignee: Nippondenso Co., Ltd., Kariya, Japan

[21] Appl. No.: 509,092

[22] Filed: Aug. 1, 1995

[30] Foreign Application Priority Data

| | | | |
|---|---|---|---|
| Aug. 2, 1994 | [JP] | Japan | 6-201479 |
| Jun. 15, 1995 | [JP] | Japan | 7-174324 |

[51] Int. Cl.$^{6}$ .......... C09K 11/00

[52] U.S. Cl. .......... 156/67; 428/690; 428/691; 428/117; 427/107; 313/504

[58] Field of Search .......... 428/690, 691, 428/917; 427/107; 313/504; 156/67

[56] References Cited

U.S. PATENT DOCUMENTS

| | | | |
|---|---|---|---|
| 4,869,973 | 9/1989 | Nishikawa et al. | 428/690 |
| 5,182,491 | 1/1993 | Taguchi et al. | 313/503 |

FOREIGN PATENT DOCUMENTS

| | | |
|---|---|---|
| 61-47096 | 3/1986 | Japan . |
| 62-98597 | 5/1987 | Japan . |
| 63-116392 | 5/1988 | Japan . |
| 2236991 | 9/1990 | Japan . |
| 2306585 | 12/1990 | Japan . |
| 393189 | 4/1991 | Japan . |
| 3187191 | 8/1991 | Japan . |
| 4133284 | 5/1992 | Japan . |

OTHER PUBLICATIONS

Mauch, et al: "High efficiency SrS,SrSe: $CeC1_3$ based thin film electroluminescent devices", Journal of Crystal Growth 117 (1992) 964–968, pp. 964–968.

*Primary Examiner*—Charles Nold
*Attorney, Agent, or Firm*—Cushman, Darby & Cushman IP Group of Pillsbury Madison & Sutro LLP

[57] ABSTRACT

A process for fabricating a blue-emitting SrS:Ce based electroluminescent device, which improves in brightness and blue color purity of the electroluminescent device, is disclosed. The blue-emitting luminescent layer of the device is formed as follows: a luminescent layer based on strontium sulfide (SrS) with cerium (Ce) doped at a concentration in a range of 0.01% by atomic or higher but less than 0.3% by atomic is deposited; and then heat treatment is applied thereto at a temperature in a range of 400° C. or higher but 550° C. or lower before forming any other layer thereon.

13 Claims, 5 Drawing Sheets

PROCESS FOR FABRICATING ELECTROLUMINESCENT DEVICE

BACKGROUND OF THE INVENTION

1. Field of the Invention

The present invention relates to an electroluminescent (EL) device for use in instruments as a segment or a matrix display device of an emissive type, in displays and the like of various types of information terminals, etc.

2. Related Arts

Electroluminescent devices known heretofore comprise a luminescent layer based on a compound of a Group II element of periodic table with a Group VI element (referred to simply hereinafter as "a Group II–VI compound") such as zinc sulfide (ZnS) or strontium sulfide (SrS) doped with an element which functions as a luminescent center. Those devices are based on the luminescent phenomenon which occurs when an electric field is applied to the luminescent layer, and are believed promising as components of a flat panel display of an emissive type. FIG. 7 shows a schematic cross-sectional view of a generally utilized EL device 10. The EL device 10 comprises a glass substrate 1 as an insulating substrate, having thereon layers formed sequentially in the order of: a first electrode 2 made of an optically transparent ITO (indium tin oxide) film and the like; a first insulating layer 3 made of tantalum pentaoxide ($Ta_2O_5$) and the like; a luminescent layer 4; a second insulating layer; and a second electrode 6. The ITO film is a transparent conductive film based on indium oxide ($In_2O_3$) doped with tin (Sn), and is widely utilized as a transparent electrode.

The luminescent layer 4 may be a zinc sulfide (ZnS) layer doped with an element such as manganese (Mn), terbium (Tb), or samarium (Sm) as a luminescent center, or a strontium sulfide (SrS) layer doped with cerium (Ce) which functions as the luminescent center.

The EL emission depends on the combination of the host material and the element that is added therein as the luminescent center. For instance, when manganese (Mn) is added to a zinc sulfide (ZnS) host material, an amber emitting EL device can be obtained. Accordingly, a green emission can be obtained by an EL device based on a ZnS layer doped with terbium (Tb), and a red emission can be obtained by an EL device based on the same host material but doped with samarium (Sm). A blue-green emitting EL device can be obtained from strontium sulfide (SrS) doped with cerium (Ce).

In general, as a SrS:Ce (SrS doped with Ce; hereinafter the same) based EL device emits a blue-green light, a filter is necessary to use it as a blue-emitting device. However, a high brightness is necessary in case of using an SrS:Ce based EL device as a blue-emitting layer. By increasing the blue color purity of SrS:Ce based EL device and thereby using it filterless, a higher brightness can be obtained as compared with the case where a filter is used. Even if a filter should be used, the blue-emitting brightness can be ameliorated by increasing the blue color purity to thereby increase the filter transmittance.

The blue color purity of a SrS:Ce based EL device can be increased by reducing the doping concentration of Ce in SrS. According to a report (see *Journal of Crystal Growth,* 117 (1992) pp. 964–968), the blue color purity can be improved to yield CIE color indices x of 0.20 and y of 0.38 by controlling the concentration of doped Ce to 0.05 atomic percent. However, the reported case fails to obtain a high brightness emission with favorable blue purity; the brightness decreases with increasing blue color purity.

Another attempt to increase the blue color purity of a SrS:Ce based EL device comprises employing a stack of cerium-free SrS layers and SrS:Ce layers (see, for example, JP-A-Hei-2-236991; the term "JP-A-" as referred herein signifies "an unexamined published Japanese patent application"). However, this method requires complicated process steps. Moreover, the blue color purity as expressed by CIE coordinates decreases as to yield a value of x=0.20 and y=0.39 on applying a heat treatment for the improvement of brightness. It can be seen from the foregoing that an EL device improved in both brightness and blue color purity is yet to be developed.

SUMMARY OF THE INVENTION

An object of the present invention is to provide a practically useful blue-emitting SrS:Ce based EL device improved in brightness without sacrificing the blue color purity thereof.

The present invention provides a process for fabricating an EL device using at least an optically transparent material for the light emission side, which comprises the steps of forming a luminescent layer based on strontium sulfide (SrS) with cerium (Ce) doped at a concentration in a range of 0.01 atomic percent or higher but less than 0.3 atomic percent, and then applying heat treatment thereto at a temperature in a range of 400° C. or higher but 550° C. or lower before forming any other layer thereon.

Preferably, a cap layer comprising a Group II–VI compound semiconductor may be formed on the luminescent layer after the heat treatment.

More preferably, the heat treatment is effected in vacuum or under an inert gas atmosphere in order to control the oxygen concentration in the luminescent layer to 0.1% or lower. It is also preferred to apply the heat treatment for a duration of more than 1 hour but less than 10 hours.

According to the EL device of the present invention, a longer mutual distance can be taken between any two Ce atoms in the SrS:Ce luminescent layer. The loss of blue emission due to energy transfer to the neighboring Ce atoms can be reduced accordingly. The blue emission brightness can be thereby increased. More specifically, a high brightness SrS:Ce based EL device having a high blue color purity can be fabricated by suppressing the energy transfer to the neighboring Ce atoms.

Furthermore, the drop in luminescent efficiency of an EL device can be prevented from occurring by providing a cap layer as a moisture-proof protective layer for the luminescent layer. Moreover, the heat treatment effected in vacuum or under an inert gas atmosphere suppresses the deterioration of brightness, because it stabilizes the luminescent layer by preventing the oxidation of the luminescent layer and the incorporation of oxygen during the heat treatment. A device further improved in brightness can be optimally achieved by controlling the duration of thermal treatment.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

The present invention is described in further detail below referring to specific examples.

Figure 1:
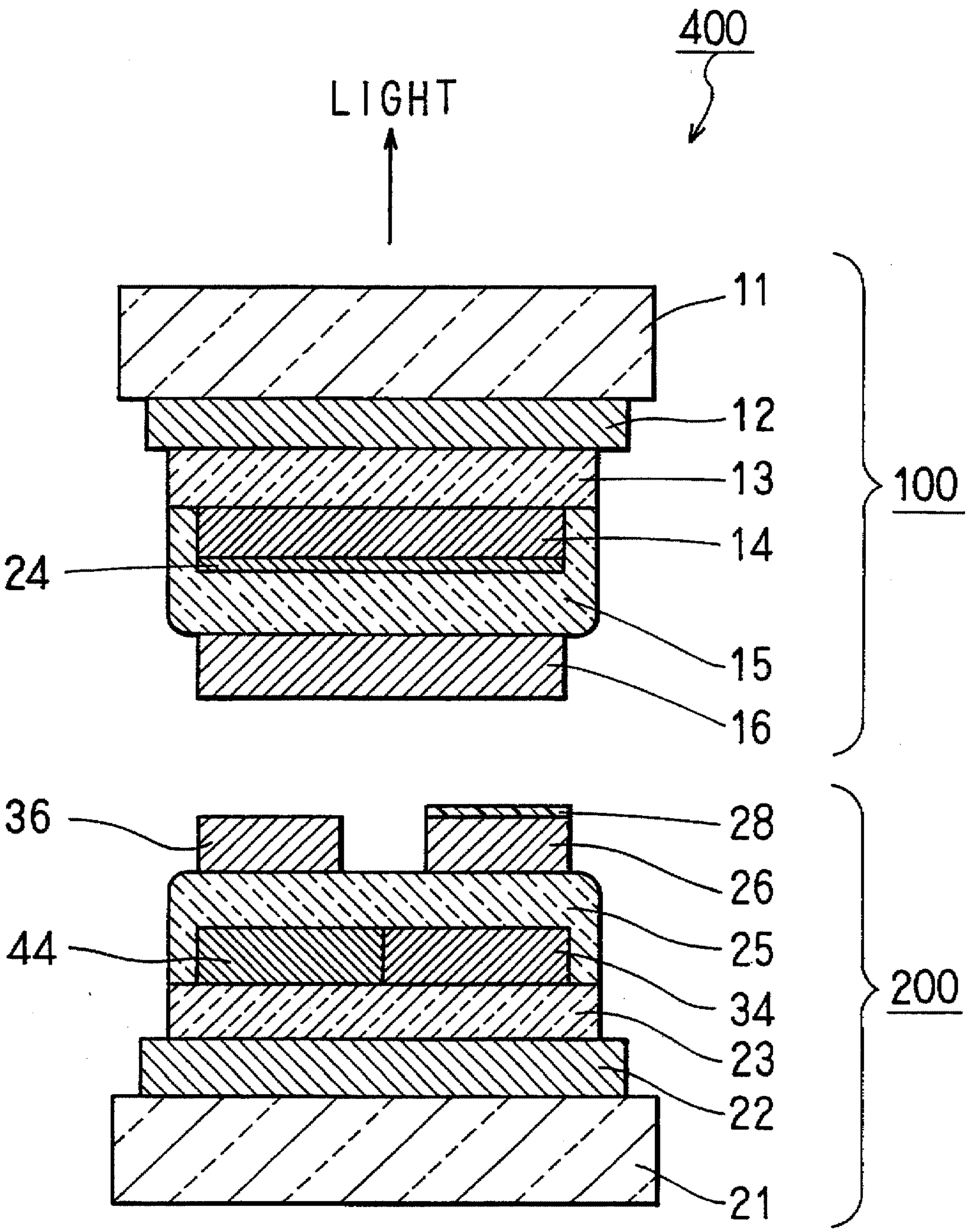
FIG. 1 is a schematic vertical cross-sectional view of an EL device according to an embodiment of the present invention.

FIG. 1 schematically shows a cross-sectional view of an EL device 400 according to an embodiment of the present invention. Referring to FIG. 1, the light outcoupling takes place in the direction indicated with an arrow. The EL device 400 comprises two separate portions, i.e., a blue-emitting EL device 100 and a red- and green-emitting EL device 200. In the description below, the film thickness is based on the value measured at the center of the film.

The process for fabricating the EL device 400 above is detailed below.

(a) A thin film of first transparent electrode 12 was deposited on a glass substrate 11. A pellet of a mixture of a zinc oxide (ZnO) powder and a gallium oxide ($Ga_2O_3$) powder was used as the evaporating material, and an ion plating apparatus (not shown in the drawings) was used for the film deposition process. More specifically, film deposition is effected by first evacuating the inside of the ion plating apparatus to vacuum while maintaining the temperature of the glass substrate 11 at a constant value, introducing argon (Ar) gas into the apparatus to maintain a constant pressure, and depositing the film at a deposition rate in a range of from 6 to 18 nm/min by controlling the beam power and the high frequency power.

(b) A first insulating layer 13 of tantalum pentaoxide ($Ta_2O_5$) was deposited thereafter on the first transparent electrode 12 by means of sputtering. More specifically, film deposition was effected by applying a high frequency power of 1 kW after introducing a mixed gas of argon (Ar) and oxygen ($O_2$) inside the sputtering apparatus while maintaining the glass substrate 11 at a constant temperature.

(c) By using strontium sulfide (SrS) as the host material and $CeF_3$ for the luminescent center, a SrS:Ce luminescent layer 14 was formed on the first insulating layer 13 by means of sputtering. More specifically, the film was deposited by introducing a mixed gas based on argon (Ar) and containing 5% of hydrogen sulfide ($H_2S$) inside the sputtering apparatus while maintaining the glass substrate 11 at a high temperature of 500° C., and applying a high frequency power of 200 W. When measured by electron probe X-ray microanalyzer (EPMA), the concentration of cerium (Ce) in the luminescent layer 14 was found to be 0.13 atomic percent.

(d) The as-deposited luminescent layer 14 was subjected to a heat treatment in vacuum at 500° C. for a duration of 4 hours without depositing anything thereon (capless state). The concentration of oxygen in the luminescent layer 14 after the heat treatment was found to be 0.1 atomic percent or lower as analyzed by means of auger electron spectroscopy (AES).

(e) A zinc sulfide (ZnS) film was formed on the luminescent layer 14 thereafter by means of electron beam evaporation for use as a cap layer 24 to prevent moisture. More specifically, the cap layer 24 was deposited in vacuum while controlling the film deposition rate in a range of from 0.2 to 0.3 nm/min while maintaining the glass substrate 11 at a temperature of 250° C.

(f) A second insulating layer 15 of tantalum pentaoxide ($Ta_2O_5$) was deposited in the same manner as in the case of depositing the aforementioned first insulating layer 13. A zinc oxide (ZnO) second transparent electrode 16 was deposited thereafter on the second insulating layer 15 in the same manner as that used in depositing the first transparent electrode above.

In the process above, the first transparent electrode 12 and the second transparent electrode 16 were each deposited at a thickness of 300 nm, the first insulating layer 13 and the second insulating layer 15 were each deposited at a thickness of 400 nm, the luminescent layer 14 was deposited at a thickness of 1,000 nm, and the cap layer 24 was deposited at a thickness of 200 nm.

(g) A first transparent electrode 22 was formed on another glass substrate 21 in the same manner as that described above.

(h) A first insulating layer 23 was deposited on the first transparent electrode 22 in the same manner as that described above. On the first insulating layer 23, a ZnS:Mn based red-emitting luminescent layer 34 and a ZnS:Tb based green-emitting luminescent layer 44 were deposited by sputtering in such a manner that the luminescent layers are located on the same plane.

(i) In a similar manner as above, a second insulating layer 25 was deposited on the ZnS:Mn based red-emitting luminescent layer 34 and the ZnS:Tb based green-emitting luminescent layer 44, and further thereon were deposited a second transparent electrode 26 over the ZnS:Mn based red-emitting luminescent layer 34 and a second transparent electrode 36 over the ZnS:Tb based green-emitting luminescent layer 44. The first transparent electrode 22, the second transparent electrodes 26 and 36, the first insulating layer 23, and the second insulating layer 25 are each deposited at the same thickness as that of the EL device 100 described above. The luminescent layers 34 and 44 were each provided at a thickness of 600 nm.

(j) An organic red color filter 28 was provided only on the second transparent electrode 26 to obtain a complete EL device 200.

(k) The second transparent electrode 16 of the EL device 100 was disposed to be opposite the second transparent electrodes 26 and 36 of the EL device 200, and the glass substrates 11 and 21 were fixed to implement an EL device 400. The EL device 400 fabricated in this manner emits red, green, blue colors, and the mixed colors thereof.

As described above, in the thin film EL device 100, thin films of an optically transparent zinc oxide (ZnO) and a tantalum pentaoxide ($Ta_2O_5$) are sequentially deposited on the insulating glass substrate 11 as the first transparent electrode 12 and the first insulating layer 13, respectively. A strontium sulfide (SrS) thin film containing cerium (Ce) at 0.13 atomic percent as a luminescent center is deposited by means of sputtering as the blue-emitting layer 14 and is annealed in vacuum at 500° C. for 4 hours with capless state. Another tantalum pentaoxide ($Ta_2O_5$) layer and a transparent zinc oxide (ZnO) layer are deposited as the second insulating layer 15 and the second transparent electrode 16.

Figure 2:
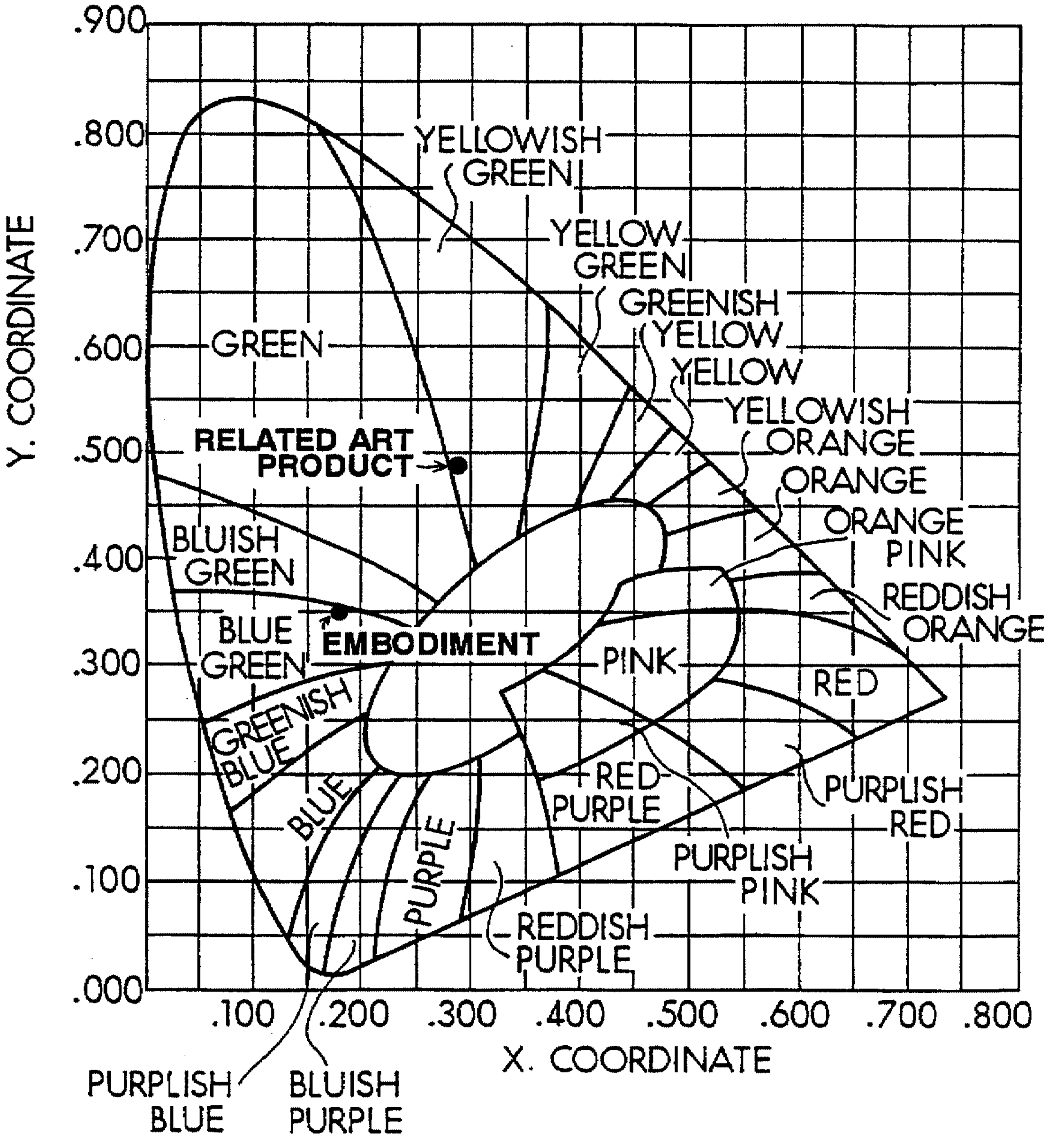
FIG. 2 is a characteristic diagram showing the CIE coordinates of a blue-emitting EL device according to the embodiment of the present invention.

On operating the blue-emitting EL device 100 thus fabricated, an emission with a blue color purity expressed by CIE coordinate of x=0.18 and y=0.35 was obtained as shown in FIG. 2. It can be seen that the blue color purity is considerably improved as compared with a related art product (refer to the CIE coordinate value plotted in FIG. 2). The value in FIG. 2 is for a related art product containing 0.61 atomic percent of cerium (Ce) in the luminescent layer and which is not subjected to a heat treatment. When compared with the EL device differing in structure as disclosed in the aforementioned literature (JP-A-Hei-2-236991), the EL device according to the present embodiment yields a higher brightness while maintaining the same color purity.

A plurality of SrS:Ce based EL devices differing in concentration of doped Ce and temperature of heat treatment applied after forming the luminescent layer (capless state) were fabricated, and the luminescent characteristics were investigated. The EL devices each fall in one of the nine different regions A to I depending on the difference in Ce concentration and heat treatment temperature. The results are summarized in FIG. 3.

Figure 3:
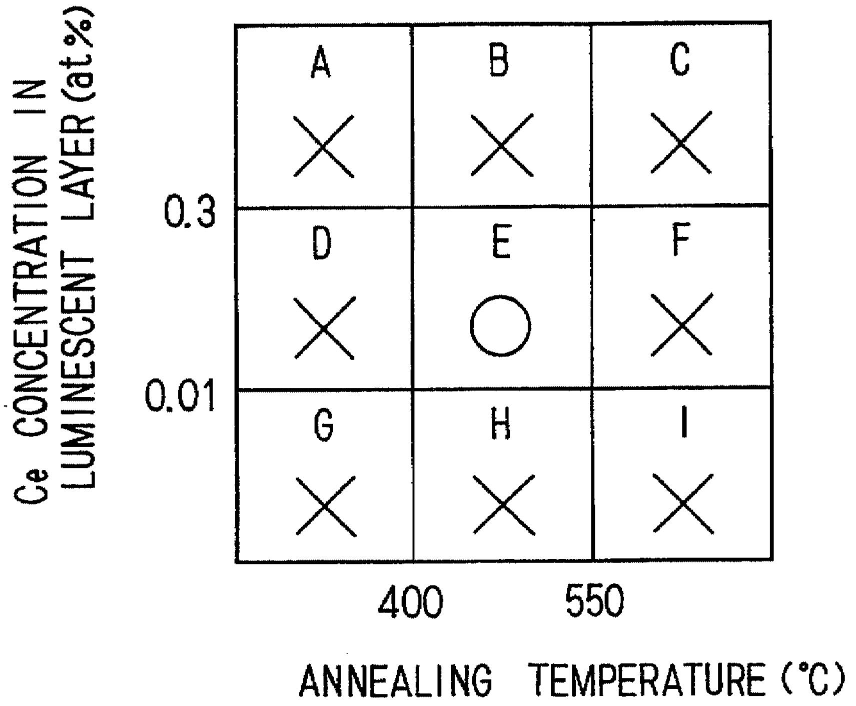
FIG. 3 is an explanatory diagram showing the difference in luminescent characteristics with differing cerium (Ce) concentration in the luminescent layer and differing temperature of heat treatment applied after forming the luminescent layer (capless state)

In FIG. 3, those yielding CIE coordinates x of 0.20 or lower and y of 0.40 or lower and a brightness twice or larger than that of the related art product are evaluated to have effect on improving the blue color purity, and are marked with a circle (○, favorable). Those falling out of the favorable region above are indicated with a cross (X, poor). It can be seen that an effective improvement in blue color purity with sufficiently high brightness are observed for the device in the region E.

In case the heat treatment is effected at a temperature higher than 550° C. (corresponding to regions C, F, and I in FIG. 3), the luminescent layer suffers damage by the heat treatment, and the resulting devices undergo breakdown even under a low applied voltage. In case the luminescent layer contains cerium (Ce) at a concentration lower than 0.01 atomic percent (corresponding to regions G, H, and I in FIG. 3), the device results in a low brightness due to the lack of cerium (Ce) which functions as the luminescent centers in the luminescent layer. In case the luminescent layer contains cerium (Ce) at a concentration higher than 0.3 atomic percent (corresponding to regions A, B, and C in FIG. 3) or is subjected to a heat treatment at a temperature lower than 400° C. (corresponding to regions A, D, and G in FIG. 3), on the other hand, no effect in the improvement of blue color purity can be observed. The heat treatment in the aforementioned description was effected on the as-deposited luminescent layer without depositing any layer thereon.

When heat treatment is effected on the luminescent layer after depositing a 200 nm thick zinc sulfide (ZnS) layer thereon as a cap layer by means of evaporation, no effect on the improvement in blue color purity was observed even for the device falling in the E region (the classification of the regions is the same as above). Accordingly, it can be seen that the desirable effect is obtained only in case the luminescent layer is formed under the conditions falling in the E region above, provided that the heat treatment is effected on the layer without depositing any other layer thereon.

Furthermore, the oxygen concentration of the luminescent layer is preferably maintained at a value of 0.1 atomic percent or lower, because the incorporation of oxygen (O) into the luminescent layer during the heat treatment considerably lowers the brightness. Accordingly, the heat treatment is effected in vacuum or under an inert gas atmosphere such as of argon (Ar). In case the heat treatment is effected for a duration of 1 hour or less, the effect of the treatment may be exhibited only insufficiently concerning the improvement in blue color purity and in brightness. On the other hand, a heat treatment effected for a duration exceeding 10 hours is not preferred, because the luminescent layer may suffer damage or an increase in oxygen concentration.

Preferred and optimum conditions for the fabrication of an EL device are summarized in the Table below. The doping concentration of Ce and the heat treatment temperature for the luminescent layer 14 are given in the Table together with the conditions and the conditions used in the present embodiment.

TABLE

| | Embodiment | Region E in FIG.3 | Optimum condition | Preferred Condition |
|---|---|---|---|---|
| Ce Concentration | 0.13 at % | 0.01–0.3 at % | 0.1–0.2 at % | 0.05–0.2 at % |
| Heat Treatment | 500° C. capless | 400–550° C. capless | 500–550° C. capless | 500–550° C. capless |

Figure 4:
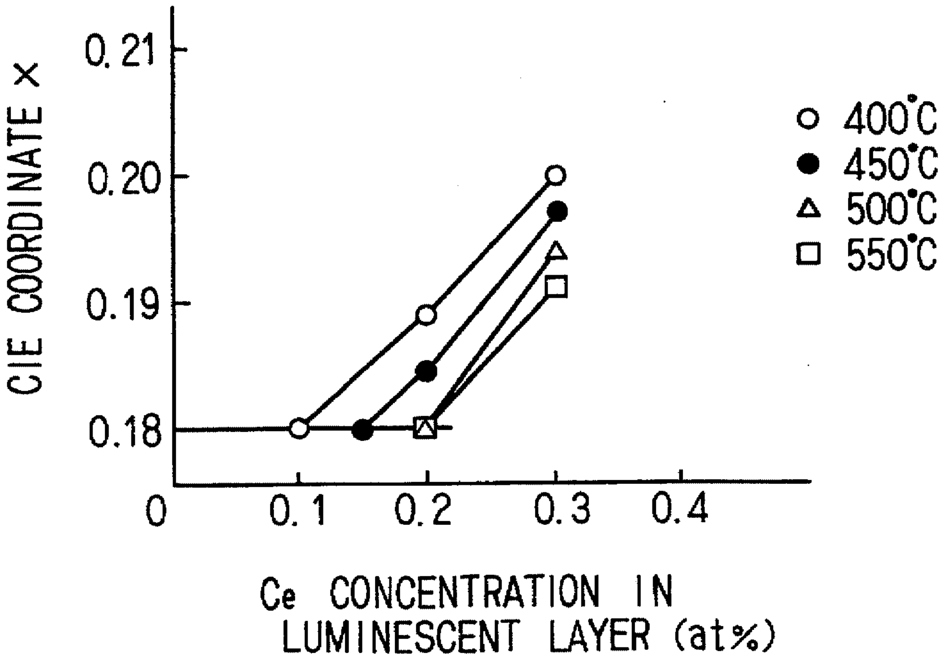
FIG. 4 is a characteristic diagram showing the change in CIE coordinate x with increasing doping concentration of cerium (Ce) in the luminescent layer.
Figure 5:
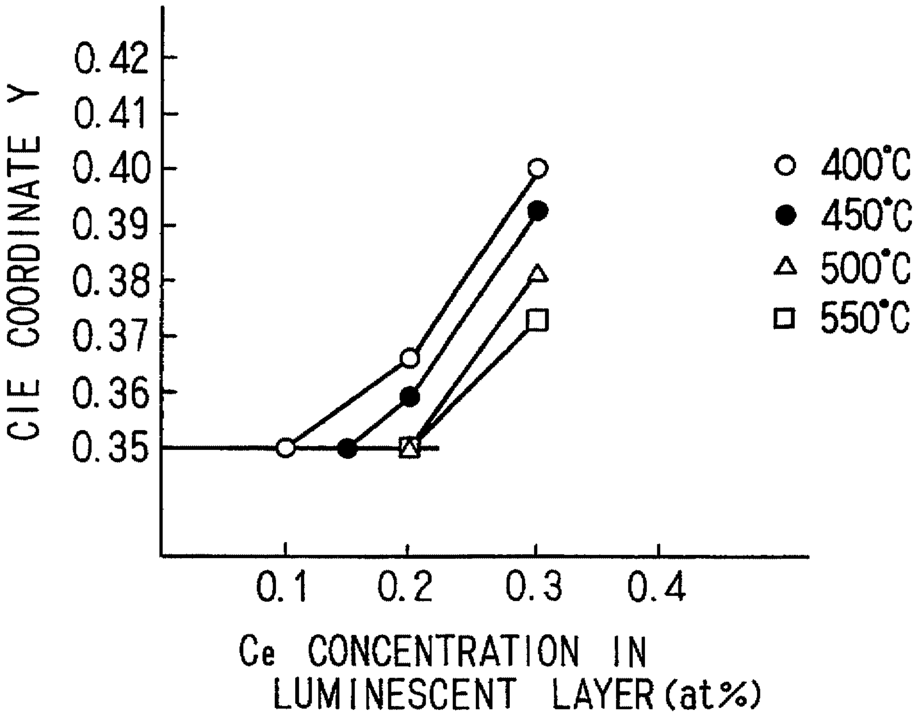
FIG. 5 is a characteristic diagram showing the change in CIE coordinate y with increasing doping concentration of cerium (Ce) in the luminescent layer.

For instance, FIG. 4 reads that, in case cerium (Ce) is added at a concentration of 0.3 atomic percent, the CIE coordinate x differs depending on the heat treatment temperature (selected from a range of from 400° to 550° C.). More specifically, a CIE coordinate x in the vicinity of 0.20 is obtained in case heat treatment is effected at a temperature of 400° C. and it decreases with increasing heat treatment temperature in such a manner as to yield an x of about 0.198 for a temperature of 450° C., an x of about 0.195 for 500° C. and an x of 0.19 for 550° C. It can be seen therefrom that the blue color purity differs depending on the temperature of heat treatment even when the cerium concentration is the same. Similarly, when cerium is added at a concentration of 0.3 atomic percent, it can be seen from FIG. 5 that the CIE coordinate y changes with increasing temperature of heat treatment in a range of from 400° to 550° C.

However, the present inventors have found that the CIE coordinates x and y saturate under specific ranges for cerium concentration and the heat treatment temperatures. The conditions for the cerium concentration and the heat treatment temperature should be fulfilled at the same time.

The preferred optimum range for the heat treatment temperature is from 500° to 550° C. If the heat treatment temperature is higher than 550° C. (e.g., 600° C.), the luminescent layer suffers damage as to undergo a device breakdown. If the heat treatment is effected at a temperature lower than 500° C. (e.g., 450° C.), the crystallinity of the luminescent layer will not be sufficiently improved, or the heat treatment may take a long duration of time. Considering measurement errors, in practice, the heat treatment temperature may exceed the lower or the upper limit by value of about 30° C. without any problem.

Taking into the aforementioned conditions into account, the present inventors have found that certain conditions which yield saturated CIE coordinates (an x or 0.18 and a y of 0.35) are present under the optimum heat treatment temperature range (from 500° to 550° C.). Under the conditions, constant CIE coordinates above are obtained irrespective of cerium concentration below 0.2 atomic percent. In other words, by maintaining the cerium concentration at a value lower than 0.2 atomic percent, saturated CIE coordinates x and y can be obtained by effecting the heat treatment at the optimal temperature range of from 500° to 550° C., and thereby provide blue color of maximum purity.

Figure 6:
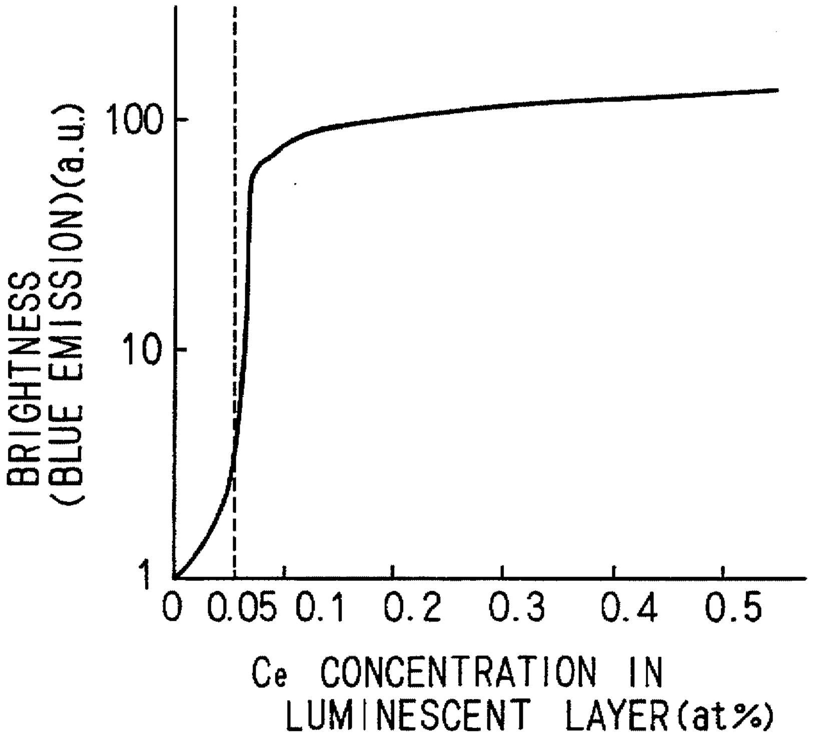
FIG. 6 is a characteristic diagram showing the change in luminescent intensity with increasing doping concentration of cerium (Ce) in the luminescent layer.
Figure 7:
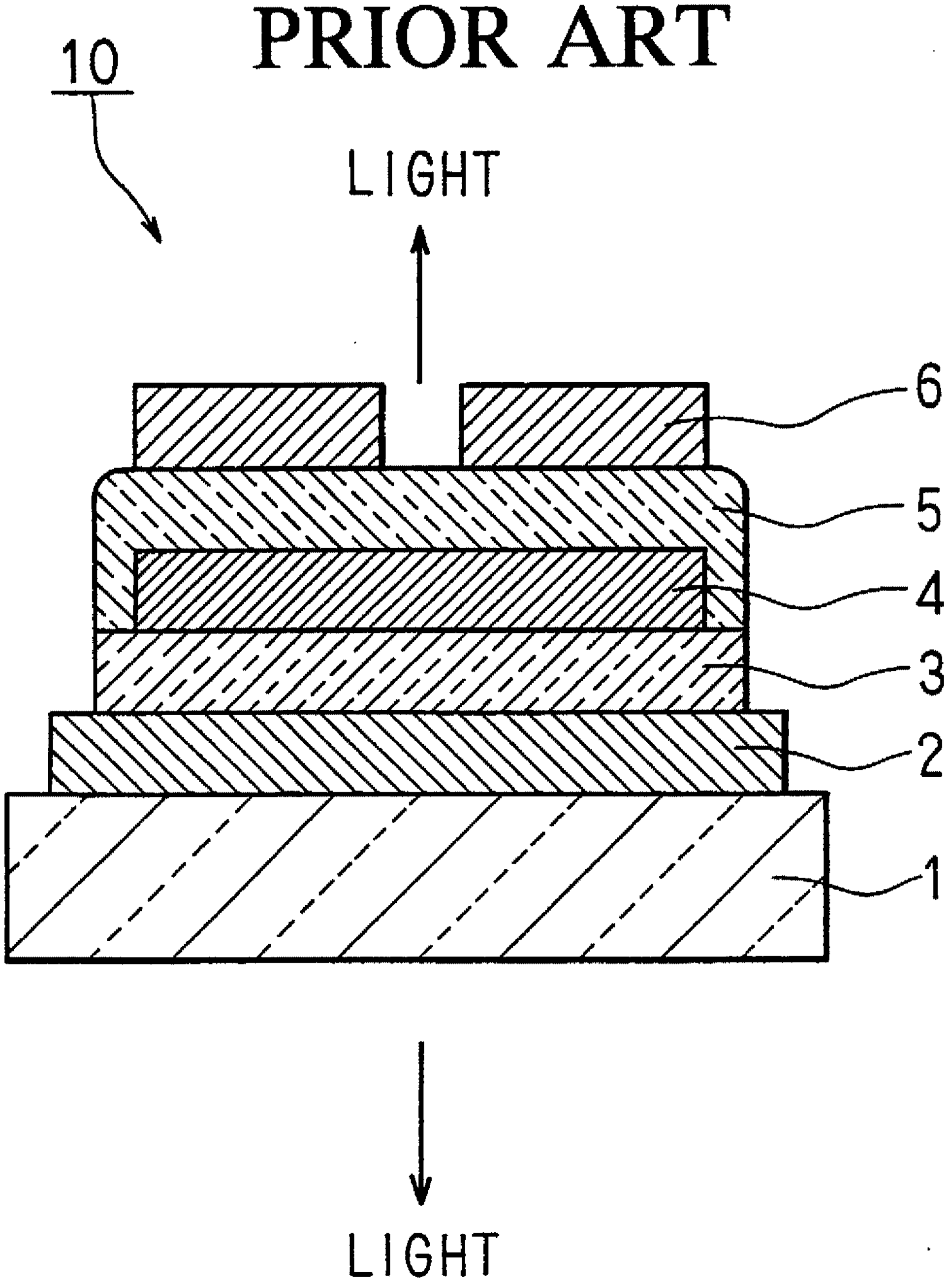
FIG. 7 PRIOR ART
FIG. 7 is a schematic cross-sectional view of a typical EL device.

Referring to FIG. 6, it can be seen that the addition of cerium at a concentration higher than 0.05 atomic percent abruptly increases the brightness, and that cerium added at a concentration of 0.1 atomic percent or higher provides a practically usable brightness. In FIG. 6, blue emission is obtained by integrating the intensity of the emission spectrum for a wavelength range of 500 nm or less.

Conclusively, the optimum conditions for achieving both high color purity and high brightness are a heat treatment temperature in a range of from 500° to 550° C. and a cerium concentration in a range of from 0.1 to 0.2 atomic percent. The preferred conditions which allow a somewhat lowered brightness are a heat treatment temperature in a range of from 500° to 550° C. and a cerium concentration in a range of from 0.05 to 0.2 atomic percent.

In the example described above, the luminescent layer 14 was formed by means of sputtering. However, the method for forming the luminescent layer 14 is not only limited thereto, and other methods, such as evaporation, metalorganic chemical vapor deposition (MOCVD), or atomic layer epitaxy (ALE) may be used to obtain the same effect described above.

As described in the foregoing, the present embodiment provides an EL device having excellent luminescent characteristics with superior blue color purity. This is achieved by forming a SrS:Ce luminescent layer containing cerium in a specified concentration range of 0.01 atomic percent or more but less than 0.34 atomic percent, and applying a heat treatment to the luminescent layer at a temperature in a range of from 400° to 550° C. before forming any other layer thereon. More preferably, an EL device having further improved luminescent characteristics can be achieved by forming a SrS:Ce luminescent layer containing cerium in a specified concentration range of 0.05 atomic percent or more but less than 0.2 atomic percent, and applying a heat treatment to the luminescent layer at a temperature in a range of from 500° to 550° C. before forming any other layer thereon.

Therefore, according to the present invention, a practically usable blue-emitting SrS:Ce based EL device improved in brightness without sacrificing the blue color purity thereof can be provided which may be used filterless. Even when a filter might be used, an ameliorated blue-emitting brightness can be obtained because the blue color purity thereof is improved to increase the filter transmittance.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A process for fabricating an electroluminescent device having an optically transparent material at least at a light emitting side thereof, comprising the steps of:

forming a luminescent layer based on strontium sulfide and containing cerium at a concentration in a range of 0.01 atomic percent or higher but less than 0.3 atomic percent; and applying heat treatment to said luminescent layer at a temperature in a range of 400° C. or higher but 550° C. or lower before forming any other layer on said luminescent layer.

2. A process for fabricating an electroluminescent device according to claim 1, further comprising a step of forming a cap layer composed of a group II–VI compound semiconductor on said luminescent layer after said step of applying said heat treatment.

3. A process for fabricating an electroluminescent device according to claim 1, wherein said heat treatment is effected in vacuum or under an inert gas atmosphere to control an oxygen concentration of said luminescent layer to 0.1 atomic percent or lower.

4. A process for fabricating an electroluminescent device according to claim 3, wherein said heat treatment is effected for a duration of longer than 1 hour but less than 10 hours.

5. A process for fabricating an electroluminescent device having an optically transparent material at least at a light outcoupling side thereof, comprising the steps of:

forming a luminescent layer based on strontium sulfide and containing cerium at a concentration in a range of 0.05 atomic percent or higher but less than 0.2 atomic percent or lower; and applying heat treatment to said luminescent layer at a temperature in a range of 500° C. or higher but 550° C. or lower before forming any other layer on said luminescent layer.

6. A process for fabricating an electroluminescent device having an optically transparent material at least at a light outcoupling side thereof, comprising the steps of:

forming a luminescent layer based on strontium sulfide and containing cerium at a concentration in a range of 0.1 atomic percent or higher but less than 0.2 atomic percent or lower; and applying heat treatment to said luminescent layer at a temperature in a range of 500° C. or higher but 550° C. or lower before forming any other layer on said luminescent layer.

7. A process for fabricating an electroluminescent device comprising the steps of:

forming a first electroluminescent device having a blue-emitting luminescent layer, said step of forming said first electroluminescent device including:

a step of depositing, over a first substrate, said blue-emitting luminescent layer which is based on strontium sulfide and contains cerium at a concentration in a range of 0.05 atomic percent or higher but 0.2 atomic percent or lower, and a step of applying heat treatment to said blue-emitting luminescent layer at a temperature in a range of 500° C. or higher but 550° C. or lower before forming any other layer on said luminescent layer;

forming a second electroluminescent device having a second substrate on which a luminescent layer emitting a color other than blue is disposed; and assembling said first electroluminescent device and said second electroluminescent device in such a manner that said blue-emitting luminescent layer of said first electroluminescent device and said luminescent layer of said second electroluminescent device are interposed between said first and second substrates.

8. A process for fabricating an electroluminescent device according to claim 7, wherein said blue-emitting luminescent layer contains cerium at a concentration in a range of 0.1 atomic percent or higher but 0.2 atomic percent or lower.

9. A process for fabricating an electroluminescent device according to claim 7, wherein said heat treatment is effected for a duration of longer than 1 hour but less than 10 hours.

10. A process for fabricating an electroluminescent device comprising the steps of:

forming a first electroluminescent device having a blue-emitting luminescent layer, said step of forming said first electroluminescent device including a step of forming, over a first substrate, said blue-emitting luminescent layer which comprises the steps of:

depositing said blue-emitting luminescent layer based on strontium sulfide and containing cerium at a concentration in a range of 0.05 atomic percent or higher but 0.2 atomic percent or lower, and applying heat treatment to said blue-emitting luminescent layer at a temperature in a range of 500° C. or higher but 550° C. or lower before forming any other layer on said luminescent layer.

forming a second electroluminescent device having a second substrate on which a luminescent layer emitting a color other than blue is disposed; and assembling said first electroluminescent device and said second electroluminescent device into a composite device wherein said blue-emitting luminescent layer of said first electroluminescent device and said luminescent layer of said second electroluminescent device are interposed between said first and second substrates and said first electroluminescent device is situated at a light emitting side of said composite device to obtain a blue light without any blue filters.

11. A process for fabricating an electroluminescent device according to claim 10, wherein said blue-emitting luminescent layer of said first electroluminescent device yields a CIE coordinate x of 0.18 and y of 0.35.

12. A process for fabricating an electroluminescent device according to claim 10, wherein said blue-emitting luminescent layer contains cerium at a concentration in a range of 0.1 atomic percent or higher but 0.2 atomic percent or lower.

13. A process for fabricating an electroluminescent device according to claim 10, wherein said heat treatment is effected for a duration of longer than 1 hour but less than 10 hours.

* * * * *